US012722223B2

(12) United States Patent
Cheong et al.

(10) Patent No.: US 12,722,223 B2
(45) Date of Patent: Sep. 1, 2026

(54) LASER WELDING PROCESS SYSTEM AND OPERATING METHOD THEREOF

(71) Applicant: SK ON CO., LTD., Seoul (KR)

(72) Inventors: Hoemin Cheong, Daejeon (KR); Hyeong Won Kim, Daejeon (KR)

(73) Assignee: SK On Co., Ltd., Seoul (KR)

( * ) Notice: Subject to any disclaimer, the term of this patent is extended or adjusted under 35 U.S.C. 154(b) by 573 days.

(21) Appl. No.: 18/229,876

(22) Filed: Aug. 3, 2023

(65) Prior Publication Data

US 2024/0165736 A1 May 23, 2024

(30) Foreign Application Priority Data

Nov. 22, 2022 (KR) ........................ 10-2022-0157669

(51) Int. Cl.

*B23K 26/03* (2006.01)
*B23K 26/21* (2014.01)
*B23K 26/26* (2014.01)
*B23K 101/36* (2006.01)
*G05B 19/402* (2006.01)
*G06T 7/00* (2017.01)
*H01M 50/169* (2021.01)

(52) U.S. Cl.

CPC ............ *B23K 26/032* (2013.01); *B23K 26/21* (2015.10); *B23K 26/26* (2013.01); *G05B 19/402* (2013.01); *G06T 7/0004* (2013.01); *H01M 50/169* (2021.01); *B23K 2101/36* (2018.08)

(58) Field of Classification Search

None

See application file for complete search history.

(56) References Cited

U.S. PATENT DOCUMENTS 3,946,212 A * 3/1976 Nakao .............. G05B 19/41875 700/89
2011/0301744 A1* 12/2011 Ichimaru ................ B25J 9/1687 700/214
2015/0287160 A1* 10/2015 Nagato ................... G06F 18/22 382/307
2017/0011236 A1* 1/2017 Kouyama ................ G06K 5/02
2018/0348726 A1* 12/2018 West .................. G05B 19/0428

(Continued)

FOREIGN PATENT DOCUMENTS

CN 104501959 A * 4/2015 ................ G01J 3/45
CN 110039523 A * 7/2019 ............. B23K 37/00
CN 113469944 A * 10/2021 ............. G06Q 50/04

(Continued)

*Primary Examiner* — John J Norton

(74) *Attorney, Agent, or Firm* — The Webb Law Firm

(57) ABSTRACT

Provided is a laser welding process system including a vision camera for recognizing a welding location of a material deposited on a welding station; a laser scan head for performing a welding process on the material through a laser light source when the welding location of the material is recognized by the vision camera; and a controller for temporarily changing an initial set value of the vision camera to perform the welding process when the welding location of the material is not recognized by the vision camera and next making a return to the initial set value, and for modifying the initial set value of the vision camera when the number of times that the welding location is not recognized exceeds a preset number.

9 Claims, 6 Drawing Sheets

(56) References Cited

U.S. PATENT DOCUMENTS

2021/0031297 A1 2/2021 Wang et al.

FOREIGN PATENT DOCUMENTS

| | | | | | |
|---|---|---|---|---|---|
| CN | 116188447 | A | * | 5/2023 | ............. G06T 7/001 |
| JP | 3767670 | B2 | * | 4/2006 | ............... G06K 9/00 |
| JP | 5131185 | B2 | | 1/2013 | |
| JP | 201485786 | A | | 5/2014 | |
| JP | 2015188901 | A | | 11/2015 | |
| KR | 1020120017662 | A | | 2/2012 | |
| KR | 1020130032425 | A | | 4/2013 | |
| KR | 1020160064310 | A | | 6/2016 | |
| KR | 101780627 | B1 | | 9/2017 | |
| KR | 1020200077329 | A | | 6/2020 | |
| KR | 1020200085274 | A | | 7/2020 | |
| KR | 20210146781 | A | * | 12/2021 | ............. G06V 20/40 |
| KR | 1020220009251 | A | | 1/2022 | |

* cited by examiner

LASER WELDING PROCESS SYSTEM AND OPERATING METHOD THEREOF

CROSS REFERENCE TO RELATED APPLICATION

The present application claims priority to Korean Patent Application No. 10-2022-0157669, filed Nov. 22, 2022, the disclosure of which is hereby incorporated by reference in its entirety.

BACKGROUND OF THE INVENTION

Field of the Invention

An embodiment of the present disclosure relates to a laser welding process system and an operating method thereof.

Description of Related Art

When various types of production equipment are operated, arbitrarily manipulating set values or variables of processes in production equipment operation may lead to many issues such as product defects in large quantities or equipment failures.

A temporary defect or problem with a particular process of production equipment may occur. If related process variables are arbitrarily changed to solve the problem and values changed in response to the temporary problem are applied as they are to subsequent processes, it could cause even bigger problems in production equipment or product production.

The foregoing is intended merely to aid in the understanding of the background of the present disclosure, and is not intended to mean that the present disclosure falls within the purview of the related art that is already known to those skilled in the art.

DOCUMENT OF RELATED ART (Patent Document 1) JP 2014-085786 A

SUMMARY OF THE INVENTION

An embodiment of the present disclosure is directed to providing a laser welding process device and an operating method thereof, the device and the method effectively changing an initial set value of a vision camera and changing a set value on the basis of recognition of a welding location in the operation process of the laser welding process device, thereby effectively improving the processing and productivity of a material.

In addition, an embodiment of the present disclosure is directed to improve the reliability of actual equipment operation by temporarily resetting a set value of a process for a problem in the operation of a laser welding process device or by modifying an initial set value.

According to an embodiment of the present disclosure, there is provided a laser welding process system including: a vision camera for recognizing a welding location of a material deposited on a welding station; a laser scan head for performing a welding process on the material through a laser light source when the welding location of the material is recognized by the vision camera; and a controller for temporarily changing an initial set value of the vision camera to perform the welding process when the welding location of the material is not recognized by the vision camera and next making a return to the initial set value, and for modifying the initial set value of the vision camera when the number of times that the welding location is not recognized exceeds a preset number.

Herein, the controller may further include an alarm for outputting an alarm to outside when the number of times that the welding location of the material is not recognized by the vision camera exceeds the preset number.

In addition, the material may be a battery casing holding a secondary battery therein, and the welding location may be a boundary that is between an upper casing and a lower casing coupled to each other and is formed at a side of the battery casing, or a boundary that is between the upper casing and the lower casing coupled to each other and is formed at a front or rear of the battery casing.

In addition, the vision camera may identify the welding location by distinguishing between contrasts of two members with respect to the boundary that is between the upper casing and the lower casing coupled to each other and is formed at the side of the battery casing, or to the boundary that is between the upper casing and the lower casing coupled to each other and is formed at the front or rear of the battery casing.

In addition, the material may be a battery cell module stacked with at least one battery cell, and including a bus bar in which a coupling hole into which an electrode tab of the at least one battery cell is received is formed for electrical connection of the electrode tab, and the welding location of the material may be a joint between the electrode tab and the coupling hole into which the electrode tab is received and coupled.

In addition, the vision camera may identify a location of an end of the bus bar and a location of an edge of the coupling hole into which the electrode tab is coupled, and may identify coordinates of the welding location in an X axis and a Y axis with respect to points of the two locations.

According to an embodiment of the present disclosure, there is provided an operating method of a laser welding process system, the operating method including: feeding a material onto a welding station; moving a laser scan head to a welding location of the material; operating a vision camera for recognizing the welding location of the material; and recognizing the welding location of the material, the recognizing including: performing a welding process through the laser scan head to run a production line when the welding location is recognized by the vision camera; or switching to an operator mode when the welding location is not recognized by the vision camera, wherein the switching to the operator mode includes: comparing a preset number with an accumulated number of times that the switching to the operator mode is performed; and temporarily resetting, when the accumulated number is equal to or less than the preset number, an initial set value of the vision camera and performing the welding process on the material to run the production line.

Herein, the switching to the operator mode may include, after the temporarily resetting of the initial set value of the vision camera and the performing of the welding process on the material to run the production line, returning the temporarily reset value of the vision camera to the initial set value.

In addition, the switching to the operator mode may include: comparing the preset number with the accumulated number of times that the switching to the operator mode is performed; switching to a manager mode when the accumulated number exceeds the preset number; and after the switching to the manager mode, modifying the initial set value of the vision camera.

The features and advantages of the present disclosure will be more clearly understood from the following detailed description based on the accompanying drawings.

The terms and words used in the present specification and claims should not be interpreted as being limited to typical meanings and dictionary definitions, but should be interpreted as having meanings and concepts relevant to the technical scope of the present disclosure based on the rule according to which an inventor can appropriately define the concept of the term to describe most appropriately the best method he or she knows for carrying out the present disclosure.

According to an embodiment of the present disclosure, the setting of the vision camera for welding location recognition during the operation of the laser welding process device is effectively reset or changed, thereby increasing the productivity of the laser welding process device and securing operation reliability.

In addition, the laser welding process device effectively senses a boundary created by the coupling of two members at each side of the battery casing holding the secondary battery therein, thereby increasing the reliability of coupling of each member of the battery casing and a production process.

In addition, a welding location between the electrode tab and the bus bar is more accurately identified using the laser welding process device to increase the precision of a welding process on the electrode tab and the bus bar, and the electrical operation capability and reliability of the battery cell module are secured through the precision of the welding process.

In addition, through switching to the operator mode and the manager mode in the operation of the laser welding process device, temporarily setting the vision camera setting or changing the initial set value is selected and determined at the appropriate time, thereby increasing the operation efficiency of the laser welding process device and effectively saving production lead time.

In addition, the recognition rate of the welding location is effectively increased through the set value of the operation of the vision camera in the operation of laser welding process device, and data acquired in the operation process of the equipment is accumulated and utilized, thereby securing the stability and reliability of the automation of the laser welding process device and more accelerating smart factory transformation in industry.

BRIEF DESCRIPTION OF THE DRAWINGS

The above and other objectives, features, and other advantages of the present disclosure will be more clearly understood from the following detailed description when taken in conjunction with the accompanying drawings, in which:

FIG. 3 is a perspective view of a secondary battery casing to which a laser welding process system according to an embodiment of the present disclosure is applied;

DESCRIPTION OF THE INVENTION

Figure 1:
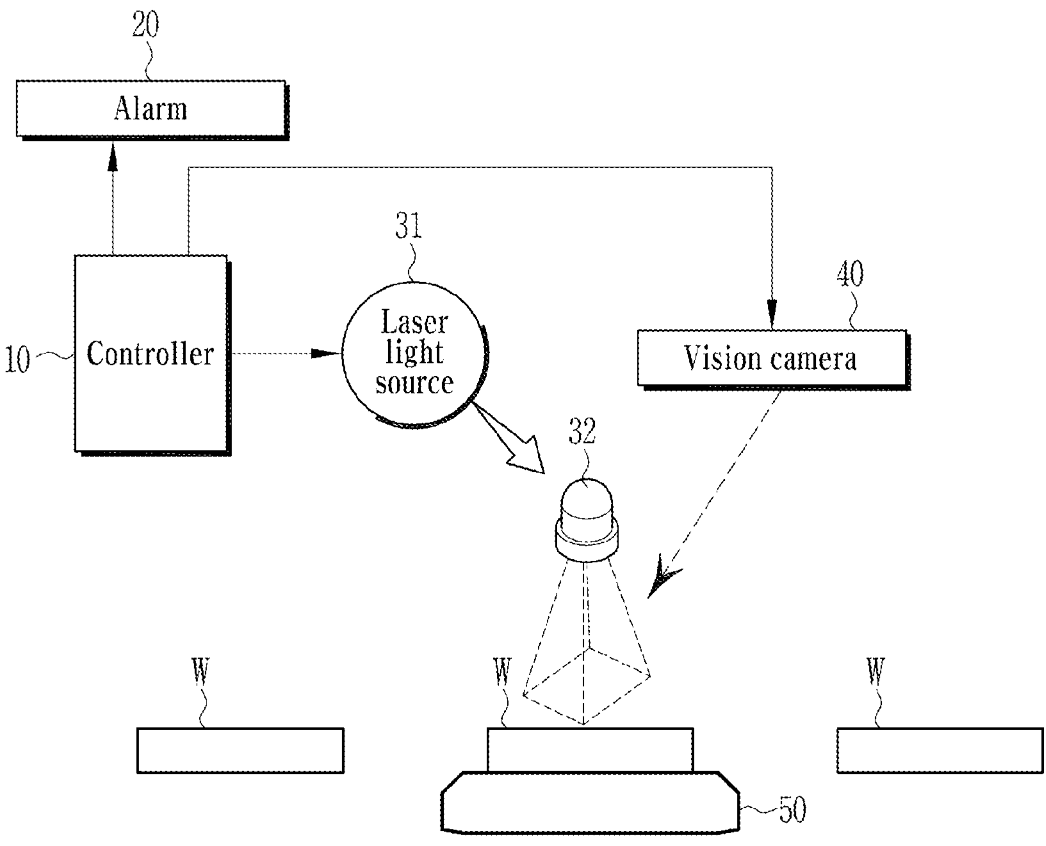
FIG. 1 is a schematic diagram of a laser welding process system according to an embodiment of the present disclosure.

The objectives, features and advantages of the present disclosure will be more clearly understood from the following detailed description of the embodiments associated with the accompanying drawings. As for reference numerals associated with elements in the drawings, the same reference numerals will refer to the same or like elements throughout the drawings. Hereinafter, in describing the present disclosure, details of the related art that would unnecessarily obscure the gist of the present disclosure will be omitted.

Hereinafter, embodiments of the present disclosure will be described in detail with reference to the accompanying drawings.

Figure 2:
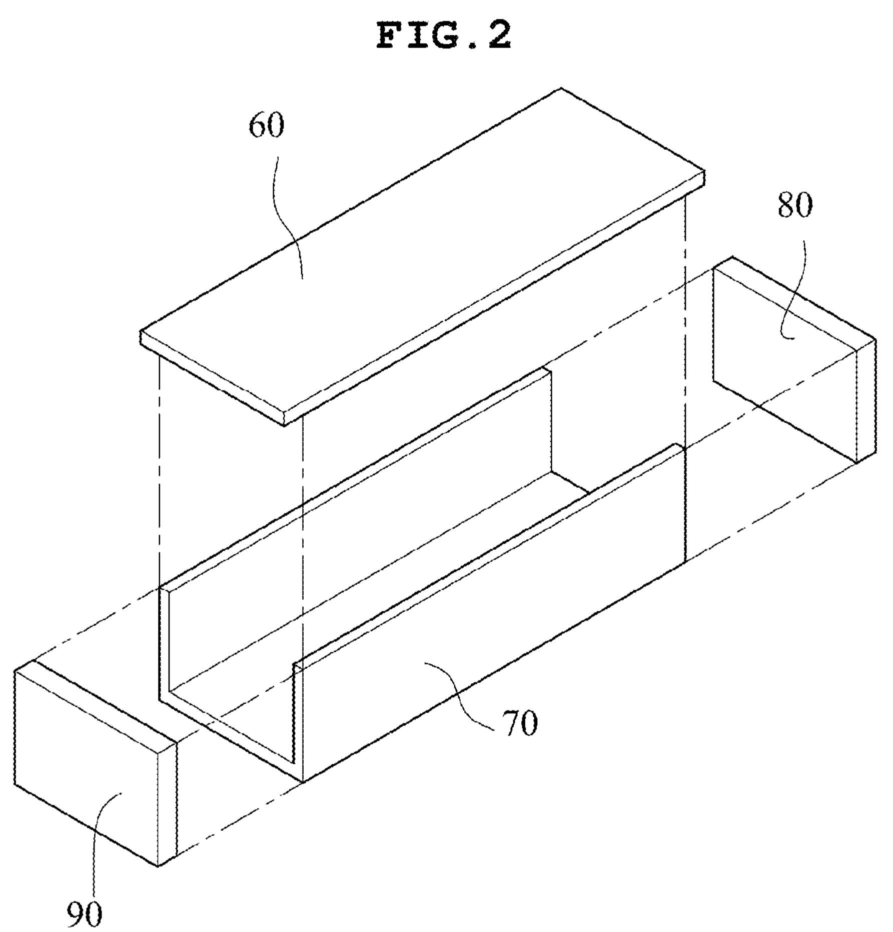
FIG. 2 is an exploded perspective view of a secondary battery casing to which a laser welding process system according to an embodiment of the present disclosure is applied.
Figure 3:
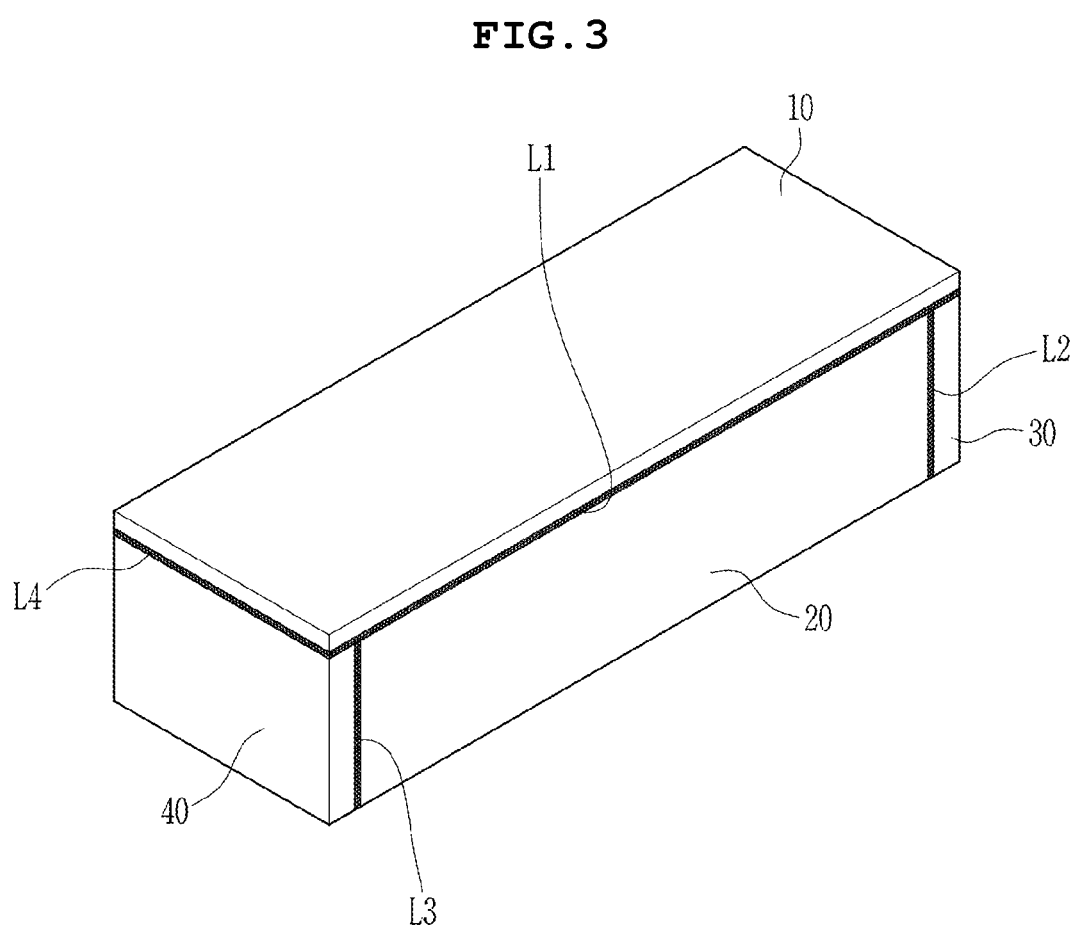
Figure 4:
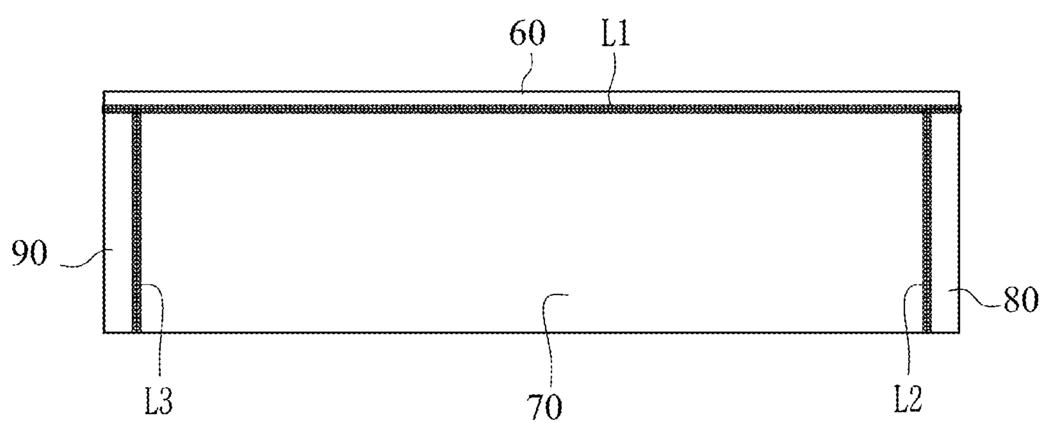
FIG. 4 is a side view of a secondary battery casing to which a laser welding process system according to an embodiment of the present disclosure is applied.
Figure 5:
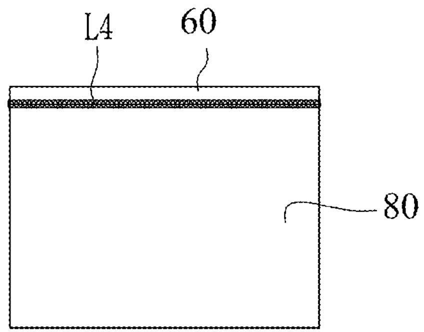
FIG. 5 is a front view of a secondary battery casing to which a laser welding process system according to an embodiment of the present disclosure is applied.
Figure 6:
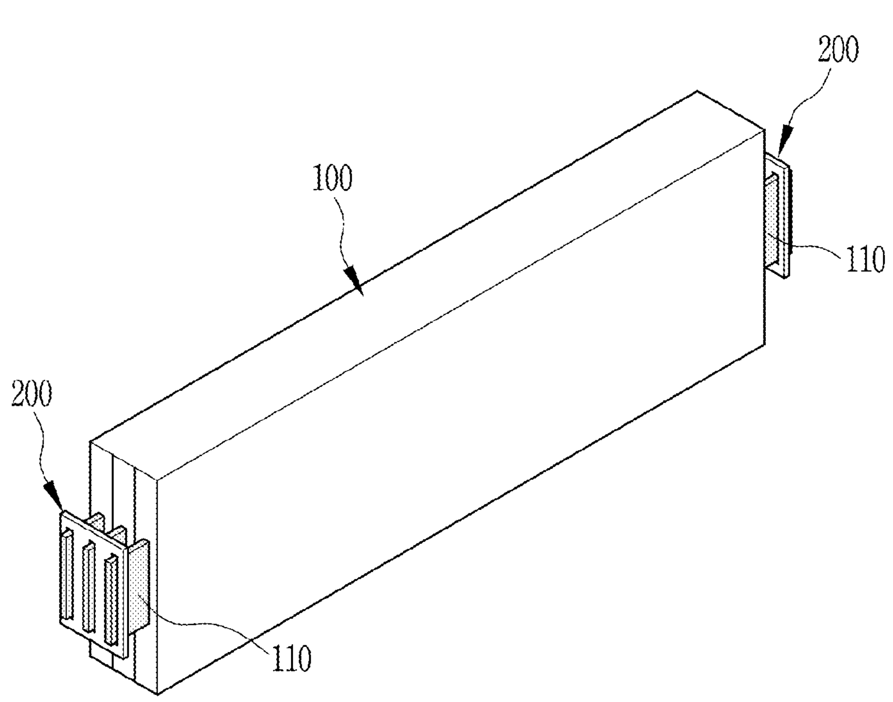
FIG. 6 is a perspective view of a battery cell module of a secondary battery to which a laser welding process system according to an embodiment of the present disclosure is applied.
Figure 7:
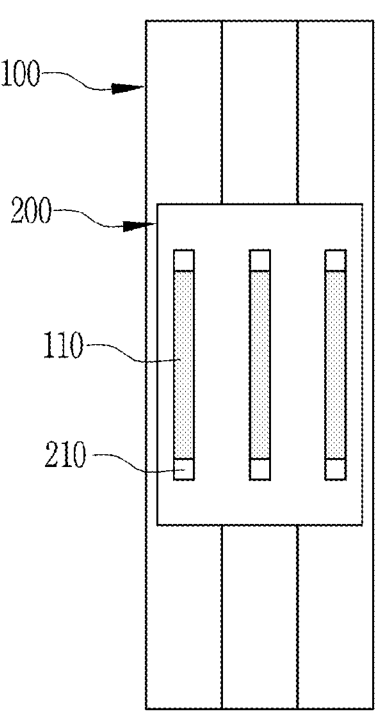
FIG. 7 is a front view of FIG. 6.

FIG. 1 is a schematic diagram of a laser welding process system according to an embodiment of the present disclosure. FIG. 2 is an exploded perspective view of a secondary battery casing to which a laser welding process system according to an embodiment of the present disclosure is applied. FIG. 3 is a perspective view of a secondary battery casing to which a laser welding process system according to an embodiment of the present disclosure is applied. FIG. 4 is a side view of a secondary battery casing to which a laser welding process system according to an embodiment of the present disclosure is applied. FIG. 5 is a front view of a secondary battery casing to which a laser welding process system according to an embodiment of the present disclosure is applied. FIG. 6 is a perspective view of a battery cell module of a secondary battery to which a laser welding process system according to an embodiment of the present disclosure is applied. FIG. 7 is a front view of FIG. 6.

A laser welding process system according to an embodiment of the present disclosure may include: a vision camera 40 for recognizing a welding location of a material (W) deposited on a welding station 50; a laser scan head 32 for performing a welding process on the material (W) through a laser light source 31 when the welding location of the material (W) is recognized by the vision camera 40; and a controller 10 for temporarily changing an initial set value of the vision camera 40 to perform the welding process when the welding location of the material (W) is not recognized by the vision camera 40 and next making a return to the initial set value, and for modifying the initial set value of the vision camera 40 when the number of times that the welding location is not recognized exceeds a preset number.

First, as shown in FIG. 1, a material (W) for a welding process is fed. When the material (W) for a welding process is deposited on a welding station 50, the vision camera 40 starts to operate to check whether the material (W) deposited on the welding station 50 is accurately aligned with a welding location. The vision camera 40 recognizes the welding location by determining a boundary location for a weld of the material (W).

When the vision camera 40 recognizes an accurate welding location, a laser is emitted from the laser light source 31 through the laser scan head 32 moved above the welding station 50 and a welding process is performed on the material (W). In this way, a production line runs through a welding process.

The vision camera 40 may set a plurality of set values for recognizing a welding location. The vision camera 40 provides a numerical value of a recognition rate through a region-of-interest (ROI) search area for a welding location of a material (W), and whether the welding location of the material is recognizable or not is determined through the calculated numerical value of the recognition rate. However, this determination method is only one example and it is to be understood that the vision camera 40 may apply various recognition determination methods through a plurality of various variables set for recognizing a welding location of a material (W).

As an example of a material (W) to which the laser welding process device of the present disclosure is applied, a battery casing, shown in FIGS. 2 and 3, holding a secondary battery therein may be used.

As shown in FIGS. 2 and 3, a battery casing in which a secondary battery is held is a combination of a lower casing 70 formed to cover the bottom and opposite sides; an upper casing 60 coupled to cover the exposed top with the same width; and a front casing 80 and a rear casing 90 having the widths the same as the horizontal and vertical widths of the front and rear.

As shown in FIG. 4, the upper casing 60 is coupled to the top of the lower casing 70 with the same width, so that the boundary line between the upper casing 60 and the lower casing 70 coupled to each other is formed at a side of the battery casing. The front casing 80 and the rear casing 90 are also coupled at the front and rear with the same width of the lower casing, so the boundary line created by each coupling may be formed at a side of the battery casing.

A laser welding process is performed on a boundary surface created by each coupling between these members, thereby manufacturing the battery casing. That is, a weld L1 on the boundary surface between the upper casing 60 and the lower casing 70 is formed at a side of the battery casing, and at the same side of the battery casing, welds L2 and L3 of joints formed by coupling the front casing 80 and the rear casing 90 are formed.

On the front and rear of the battery casing, as shown in FIG. 5, a weld L4 of the boundary between the upper casing 60 and the front casing 80 coupled to each other may be formed and a weld L4 of the boundary between the upper casing 60 and the rear casing 90 coupled to each other may be formed on the rear in the same manner.

In this way, regarding a location of a boundary between the upper casing 60 and the lower casing 70 coupled to each other on a side of the battery casing or boundaries created by the coupling of the lower casing and the front casing 80 and the rear casing 90, a weld on a boundary, at which welding is performed through identification by contrast, color, and various positional differences between two members, may be checked and a welding process may be performed.

In this way, the vision camera 40 recognizes a boundary at which two members are coupled on each side of a battery casing holding a secondary battery therein, and precisely senses a location for a welding process, thereby increasing the reliability and precision of battery case manufacturing.

As another example of a material (W) to which the laser welding process device of the present disclosure is applied, a battery cell module, shown in FIGS. 6 and 7, to which a bus bar 200 is coupled may be used.

The battery cell module is formed by stacking one or more battery cells 100, and electrode tabs 110 of the battery cells 100 may be coupled to a bus bar 200 for electrical connection to an external power source.

As shown in FIGS. 6 and 7, an electrode tab 110 of a battery cell 100 may be received and coupled into a coupling hole 210 of the bus bar 200. Herein, a welding location may be identified on a boundary surface where an electrode tab 110 and a coupling hole 210 shown in FIG. 7 are joined in the front direction, and the two members are welded for coupling.

The vision camera 40 identifies a location of an end of the bus bar 200 and a location of an edge of a coupling hole 210 into which an electrode tab 110 is received and coupled, through difference in contrast or color between the two members. Herein, an edge of a coupling hole 210 means, when an electrode tab 110 is coupled into the coupling hole 210 as shown in FIG. 7, a location, that is, a space, between an end of the coupling hole 210 and the coupled electrode tab 110.

In this way, the vision camera 40 may identify a location of a space between a location of an end of the bus bar 200 and an electrode tab 110 received and coupled into a coupling hole 210 at an end of the coupling hole. This enables setting location coordinates in the X and Y axes where the coupling hole 210 and the electrode tab 110 are actually welded for coupling. That is, the coordinates of the welding location may be specified through a location value relative to the two identified locations, and the welding location is precisely specified, thereby further increasing the reliability of welding coupling between the electrode tab 110 and the bus bar 200.

When a calculated numerical value based on a recognition rate of the vision camera 40 is equal to or less than a predetermined numerical value, it is determined that recognition is impossible and the controller may output warning or other signals through an alarm 20 for notifying the outside of a signal indicating that recognition is impossible. In addition, the signal indicating that the vision camera 40 is unable to achieve recognition may be transmitted to other devices in addition to the alarm 20 in a wired or wireless manner and output and displayed.

When the vision camera 40 is unable to recognize a welding location of a material (W), a signal for reporting this is transmitted to the alarm 20 to induce an operator to temporarily change or reset the setting of the vision camera 40 so that the laser welding process system operates smoothly. That is, as described above, when an error occurs in the vision camera 40 for sensing a welding location for each member of a battery casing, any set value appropriate for the battery casing is input to re-sense a welding location of a joint of the battery casing, thereby maintaining the progress of the welding process smoothly.

However, in this case, it is preferable that the setting of the vision camera 40 is temporarily changed to progress the process and returning to the initial set value of the vision camera 40 takes place. For example, in the case of the battery case described above, if the battery casing has a general shape and specification, sensing a welding location with the original set value of the vision camera 40 in the subsequent process enables the reliability of the process to be effectively maintained.

In addition, similarly, the same error may occur in performing a welding process on an electrode tab 110 and a coupling hole 210 of a bus bar 200. For example, when it is difficult to identify a location of a space between a location of an end of a bus bar 200 and an electrode tab 110 coupled into a coupling hole 210 at an end of the coupling hole or when an error occurs, a coordinate value, which is the fmal welding location between the electrode tab 110 and the coupling hole 210, in the X and Y axes has an error. In this case, a welding process may be progressed smoothly by temporarily changing a set value according to the characteristics of the material, such as a location or contrast. For a material for a welding process fed later, progressing the process with the initial set value may increase the precision and reliability of a production line.

However, when the number of times that the vision camera 40 is unable to recognize a welding location of a material (W) increases, that is, when a situation that is not considered to be a temporary phenomenon arises, the initial set value of the vision camera 40 for location recognition may be requested to be modified or reset. Examples of the situation are as follows: the case in which the specification of a battery casing fed as a material (W) is changed; and the case in which a change in the specification of an electrode tab or a bus bar causes continuous errors in sensing a welding location.

This may be determined from the fact that the accumulated number of signals for reporting that the vision camera 40 is unable to recognize a welding location of a material (W) exceeds a preset number for the reliability of an equipment process. However, in addition to the accumulated number of signals indicating that the vision camera 40 is unable to achieve recognition, the relationship between the frequency (time difference) and the number of occurrences of the signals may be collectively considered. The relevant data accumulated through this operation may enable more reliable device operation to be realized through a process of training artificial intelligence for the construction of a smart factory.

When the accumulated number of signals indicating that the vision camera 40 is unable to recognize a welding location of a material (W) exceeds a preset value, the initial set value of the vision camera 40 for recognizing a welding location may be modified and changed into a new set value by the controller 10.

Figure 8:
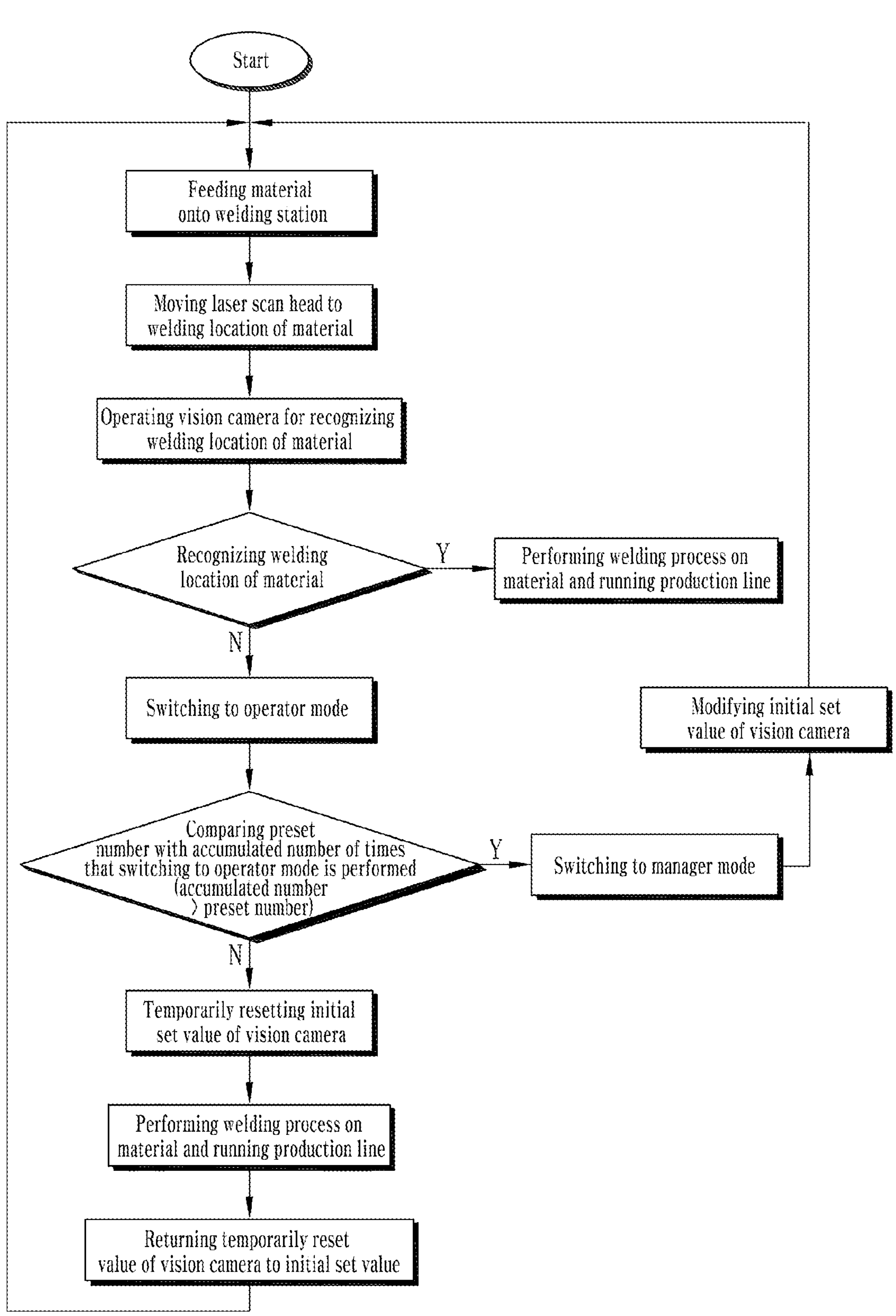
FIG. 8 is a flowchart of an operating method of a laser welding process system according to an embodiment of the present disclosure.

FIG. 8 is a flowchart of an operating method of a laser welding process system according to an embodiment of the present disclosure.

An operating method of a laser welding process system according to an embodiment of the present disclosure may include: feeding a material onto a welding station; moving a laser scan head to a welding location of the material; operating a vision camera for recognizing the welding location of the material; and recognizing the welding location of the material, the recognizing including performing a welding process through the laser scan head to run a production line when the welding location is recognized by the vision camera, or switching to an operator mode when the welding location is not recognized by the vision camera. The switching to the operator mode includes: comparing a set number with the accumulated number of times that the switching to the operator mode is performed; and temporarily resetting, when the accumulated number is equal to or less than the set number, an initial set value of the vision camera and performing the welding process on the material to run the production line.

As shown in FIG. 6, first, a material is fed onto a welding station. The material to be subjected to a laser welding process is fed onto the welding station.

Herein, the laser scan head is moved to the welding location of the material. Above the welding station, the laser scan head may prepare the welding process on the welding location of the material as the material is fed.

Next, the vision camera operates to recognize the welding location of the material. The vision camera recognizes the welding location of the material, and may help the welding process on an accurate location of the material through the laser scan head with a laser emitted from the laser light source to the welding location.

This is the case in which the vision camera operates and the vision camera is able to recognize the welding location of the material. In this case, a laser is emitted through the laser scan head and the production line runs through the welding process on the material.

The vision camera may be unable to recognize the welding location of the material. As already described above, in this case, for example, the vision camera provides a numerical value of a recognition rate through an ROI search area for the welding location of the material and whether the welding location is recognizable or not may be determined through the numerical value of the set recognition rate. For example, it may be determined that when a recognition rate exceeds a preset predetermined numerical value, the vision camera is able to recognize the welding location of the material or that when a recognition rate is equal to or less than the numerical value, the vision camera is unable to recognize the welding location of the material.

When the vision camera is unable to recognize the welding location of the material, switching to the operator mode takes place. In the operator mode, a general operator temporarily changes or resets the initial set value of the vision camera. Therefore, in the operator mode, the initial set value of the vision camera is not changed or modified. Herein, an operator manually changes a set value offline. However, in the case of a standardized situation that may occur frequently depending on the characteristics or shape of a material, temporarily changing or resetting the initial set value of the vision camera may be automatically realized by an additional system.

In this case, the initial set value of the vision camera is not changed. Therefore, when the welding process on the material is completed after the setting of the vision camera is temporarily changed, an automatic return to the initial set value of the vision camera is made at the next step and the vision camera performs the welding location recognition process on the material.

The switching to the operator mode may include counting the accumulated number of times that the vision camera is unable to recognize a welding location of a material and comparing the accumulated number with the preset number.

This comparing step is to determine the case in which the frequency of recognition errors in material welding locations by the vision camera increases.

When the accumulated number of times that the vision camera is unable to recognize a welding location of a material, that is, the accumulated number of times that the switching to the operator mode is performed, is equal to or less than the preset number, the initial set value of the vision camera is temporarily reset and the material is subjected to the welding process and the production line runs. Next, a returning to the initial set value of the vision camera takes place.

However, when the accumulated number of times that the switching to the operator mode is performed exceeds the preset number, the initial set value of the vision camera may be a problem. In this case, another step is needed to take measures.

Therefore, when the accumulated number of times that the switching to the operator mode is performed exceeds the preset number, switching to a manager mode takes place. The switching to the manager mode is to modify the initial set value of the vision camera when the vision camera is unable to recognize the welding location of the material.

That is, the scope of access authority to change the setting in the manager mode is completely different from that in the operator mode described above. In this case, even in this system, data of change in the set value is directly applied to the initial set value, so that all future welding processes are progressed with the changed set value of the vision camera.

Accordingly, it is possible to secure the operational reliability of the equipment of the laser welding process system, and not just a temporary measure of simple setting change, but to actually increase the precision and reliability of a welding location of a material through the vision camera, thereby stably maintaining the lead time of product production within a predetermined range.

Although the embodiments of the present disclosure have been disclosed for illustrative purposes, it will be appreciated that the present disclosure is not limited thereto, and those skilled in the art will appreciate that various modifications, additions and substitutions are possible, without departing from the scope and spirit of the present disclosure.

Further, simple changes and modifications of the present disclosure are appreciated as included in the scope and spirit of the present disclosure, and the protection scope of the present disclosure will be defined by the claims.

What is claimed is:

1. A laser welding process system, comprising:

a vision camera for recognizing a welding location of a material deposited on a welding station;

a laser scan head for performing a welding process on the material through a laser light source when the welding location of the material is recognized by the vision camera; and a controller for temporarily changing an initial set value of the vision camera to perform the welding process when the welding location of the material is not recognized by the vision camera and next making a return to the initial set value, and for modifying the initial set value of the vision camera when the number of times that the welding location is not recognized exceeds a preset number.

2. The laser welding process system of claim 1, wherein the controller further comprises an alarm for outputting an alarm to outside when the number of times that the welding location of the material is not recognized by the vision camera exceeds the preset number.

3. The laser welding process system of claim 1, wherein the material is a battery casing holding a secondary battery therein, and the welding location is a boundary that is between an upper casing and a lower casing coupled to each other and is formed at a side of the battery casing, or a boundary that is between the upper casing and the lower casing coupled to each other and is formed at a front or rear of the battery casing.

4. The laser welding process system of claim 3, wherein the vision camera identifies the welding location by distinguishing between contrasts of two members with respect to the boundary that is between the upper casing and the lower casing coupled to each other and is formed at the side of the battery casing, or to the boundary that is between the upper casing and the lower casing coupled to each other and is formed at the front or rear of the battery casing.

5. The laser welding process system of claim 1, wherein the material is a battery cell module stacked with at least one battery cell, and comprising a bus bar in which a coupling hole into which an electrode tab of the at least one battery cell is received is formed for electrical connection of the electrode tab, and the welding location of the material is a joint between the electrode tab and the coupling hole into which the electrode tab is received and coupled.

6. The laser welding process system of claim 5, wherein the vision camera identifies a location of an end of the bus bar and a location of an edge of the coupling hole into which the electrode tab is coupled, and identifies coordinates of the welding location in an X axis and a Y axis with respect to points of the two locations.

7. An operating method of a laser welding process system, the operating method comprising the steps of:

feeding a material onto a welding station;

moving a laser scan head to a welding location of the material;

operating a vision camera for recognizing the welding location of the material; and recognizing the welding location of the material, the recognizing comprising: performing a welding process through the laser scan head to run a production line when the welding location is recognized by the vision camera; or switching to an operator mode when the welding location is not recognized by the vision camera, wherein the switching to the operator mode comprises:

comparing a preset number with an accumulated number of times that the switching to the operator mode is performed; and temporarily resetting, when the accumulated number is equal to or less than the preset number, an initial set value of the vision camera and performing the welding process on the material to run the production line.

8. The operating method of claim 7, wherein the switching to the operator mode comprises, after the temporarily resetting of the initial set value of the vision camera and the performing of the welding process on the material to run the production line, returning the temporarily reset value of the vision camera to the initial set value.

9. The operating method of claim 7, wherein the switching to the operator mode comprises:

comparing the preset number with the accumulated number of times that the switching to the operator mode is performed;

switching to a manager mode when the accumulated number exceeds the preset number; and after the switching to the manager mode, modifying the initial set value of the vision camera.

* * * * *